United States Patent
Nakao et al.

(10) Patent No.: US 6,609,286 B2
(45) Date of Patent: Aug. 26, 2003

(54) PROCESS FOR MANUFACTURING A PART OF A METAL MATRIX COMPOSITE MATERIAL

(75) Inventors: Yasuhiro Nakao, Sayama (JP); Hiroto Shoji, Sayama (JP); Kunitoshi Sugaya, Sayama (JP); Takashi Kato, Sayama (JP); Takaharu Echigo, Sayama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 91 days.

(21) Appl. No.: 09/848,481

(22) Filed: May 3, 2001

(65) Prior Publication Data

US 2001/0039710 A1 Nov. 15, 2001

(30) Foreign Application Priority Data

May 10, 2000 (JP) .......................... 2000-137678
May 10, 2000 (JP) .......................... 2000-137685
Jul. 11, 2000 (JP) .......................... 2000-210513

(51) Int. Cl.⁷ .............................................. B23P 17/00
(52) U.S. Cl. .................... 29/412; 72/342.92; 72/352; 72/364; 148/691
(58) Field of Search .................... 29/412, 415, 417, 29/894.325; 148/691, 695; 72/342.92, 352, 364; 188/218 XL

(56) References Cited

U.S. PATENT DOCUMENTS

| | | | | |
|---|---|---|---|---|
| 3,926,029 A | * | 12/1975 | Abson et al. | 72/342.92 |
| 3,984,043 A | | 10/1976 | Kreider et al. | |
| 4,753,690 A | | 6/1988 | Wada et al. | |
| 5,851,568 A | * | 12/1998 | Huang | 425/356 |
| 5,881,796 A | * | 3/1999 | Brown et al. | 164/113 |

FOREIGN PATENT DOCUMENTS

| | | |
|---|---|---|
| EP | 0 368 789 | 5/1990 |
| GB | 2 005 166 | 4/1979 |
| JP | 59206154 | 11/1984 |
| JP | 63-268531 | 7/1988 |
| JP | 4-33737 | 5/1992 |
| JP | 8-206768 | * 8/1996 |
| JP | 10-180396 | 7/1998 |

* cited by examiner

Primary Examiner—David P. Bryant
(74) Attorney, Agent, or Firm—Merchant & Gould P.C.

(57) ABSTRACT

A part is manufactured from a composite material containing an aluminum alloy as a metal matrix. Blanks are prepared from a billet of the composite material, and worked on in a press, while they are held at a temperature ranging from the solidus temperature, Ta, of the aluminum alloy minus 50 (Ta−50) deg. C. to Ta deg. C. At a temperature below (Ta−50), the blanks have too high a resistance to plastic deformation to be easily worked on. At a temperature over Ta, a liquid phase is produced and makes the blanks likely to crack easily during plastic deformation.

3 Claims, 17 Drawing Sheets

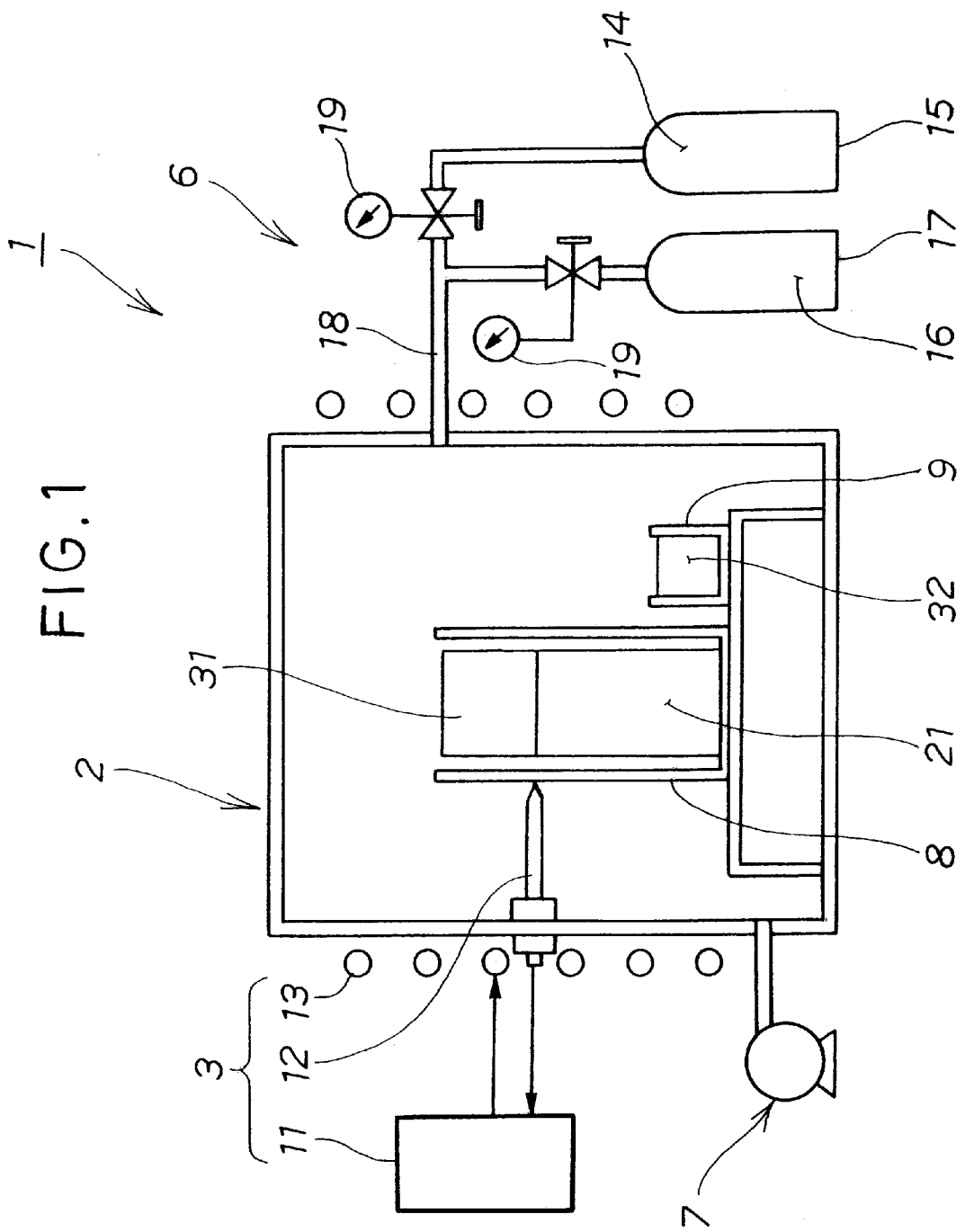

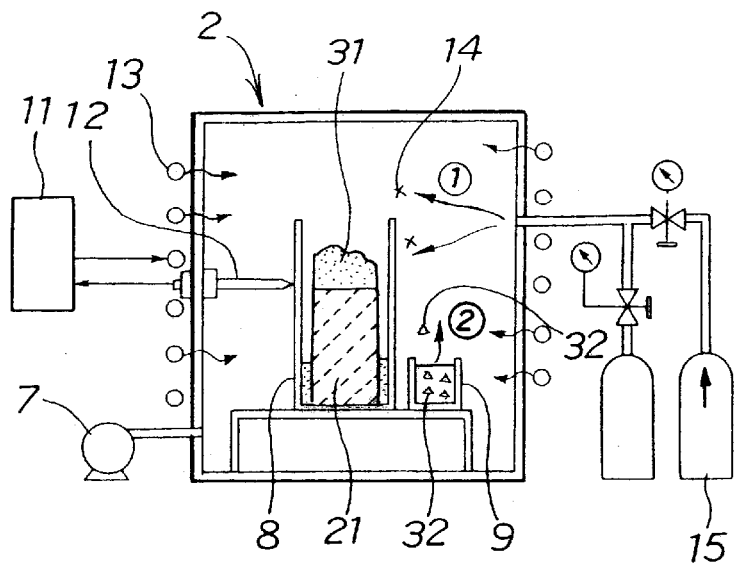
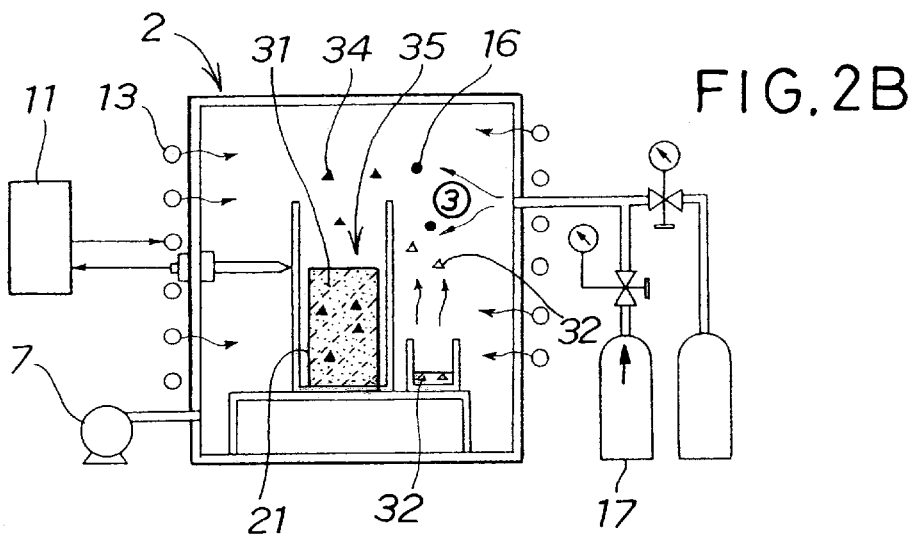
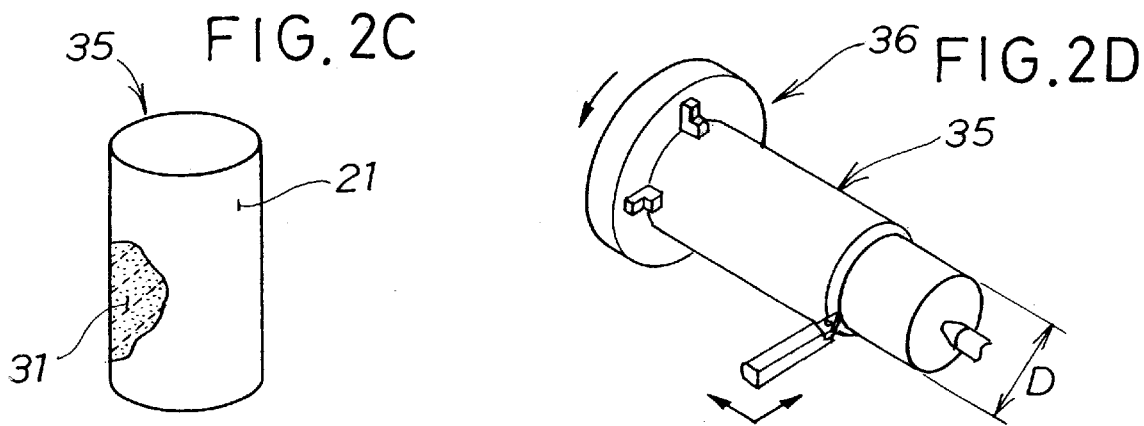

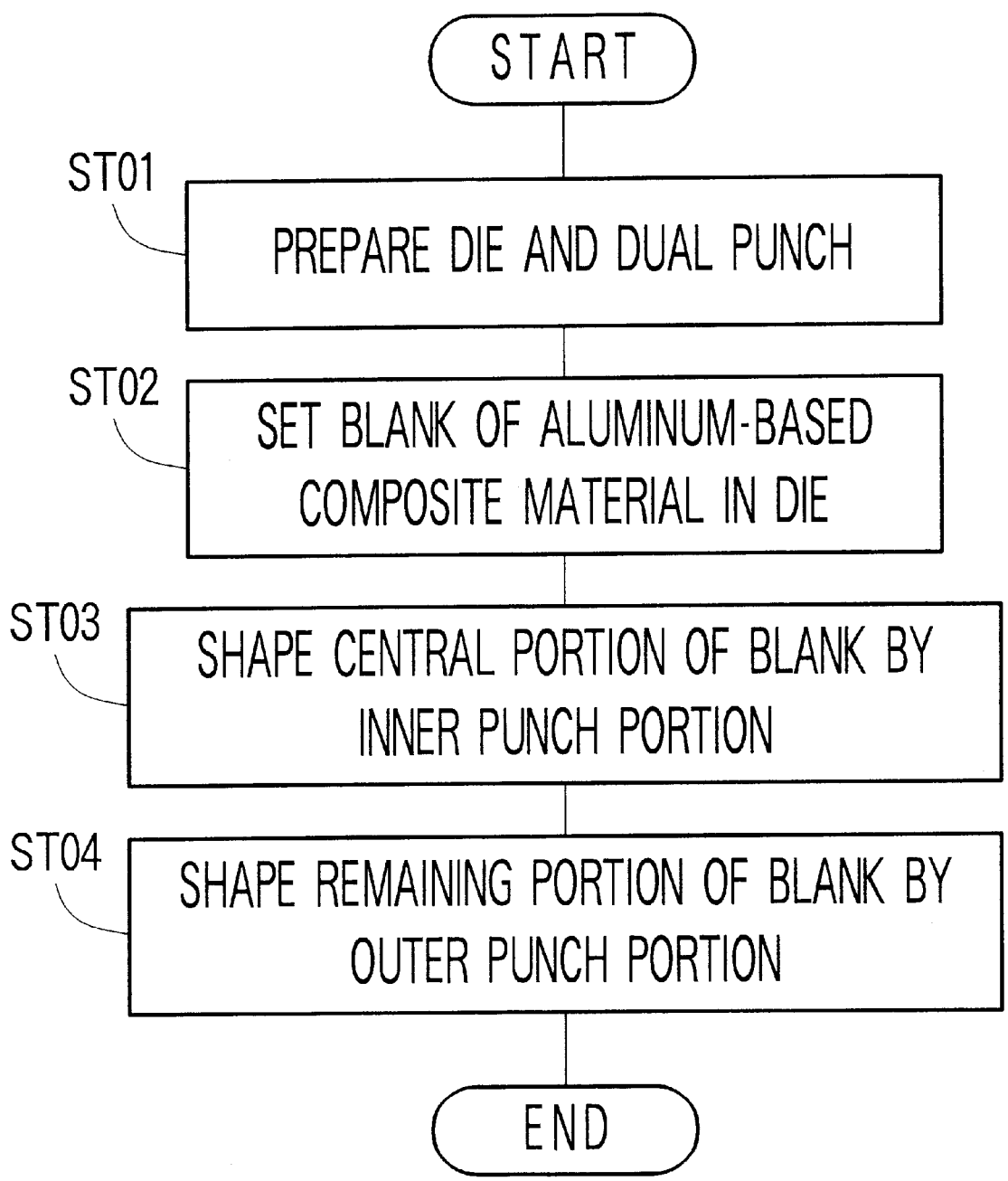

PROCESS FOR MANUFACTURING A PART OF A METAL MATRIX COMPOSITE MATERIAL

BACKGROUND OF THE INVENTION

1. Field of the Invention

This invention relates to a process for manufacturing a part of a metal matrix composite material.

2. Description of the Related Art

A process for manufacturing a cylinder as disclosed in Japanese Patent Laid-Open Publication No. SHO-59-206154, for example, is known as a process for manufacturing a desired shape by plastic working from an aluminum-based composite material. It comprises:

(a) Dispersing SiC chips in a molten bath of aluminum under stirring and causing it to solidify;

(b) Heating a solidified product to a temperature of about 250 deg. C. and drawing it into a pipe; and (c) Cutting a sleeve from the pipe, fitting it in a die casting mold and casting an aluminum alloy (JIS-ADC12) about it to make a cylinder.

The sleeve is a composite material obtained by putting SiC chips in a molten bath of aluminum and has a high resistance to plastic deformation, and its aluminum and SiC are mechanically joined to each other. Therefore, it is low in elongation and is as poor in workability as any other common composite material. As a consequence, it is difficult to employ for plastic working, such as drawing, to make a molded product of high quality at a reduced cost.

A part of a composite material can also be made by press forming, but a high resistance to plastic deformation brings about a high cost of production and makes it difficult to obtain a product of improved quality.

FIG. 17 hereof shows a disk brake device for an automobile. The disk brake device 202 has a brake disk 203 mounted by a hub 201 attached to the end of a drive shaft 200, and a caliper 206 in which an edge portion of the disk 203 is engaged. A hydraulic pressure is transmitted through a passage 208 to a cylinder not shown in the caliper 206 to press two brake pads 207 against the edge portion 205 of the brake disk 203 to thereby brake a wheel 209. Therefore, the brake disk 203 has to be formed from a material of high strength, while it is also desirable to use a light material to reduce the weight of the automobile.

A metal matrix composite material is known as a material of high strength and light weight. For example, a composite material containing an aluminum alloy can be used to achieve a weight reduction and a material containing SiC (silicon carbide) particles in an aluminum alloy makes it possible to achieve a high strength.

A brake disk 203 can be made by casting from such an aluminum-based composite material. A large amount of heat energy is, however, required for melting such a material and brings about an increase of production cost. Study has, therefore, been made of the possibility of relying upon press forming for manufacturing brake disks 203 in a large quantity without having to melt the material.

FIGS. 18A and 18B show a known method of manufacturing a brake disk from a composite material containing an aluminum alloy as a metal matrix. An aluminum-based composite material 210 is prepared in the form of a flat sheet, as shown in FIG. 18A, and is press formed into a brake disk 211, as shown in FIG. 18B. The brake disk 211 has a hub 213 having a recessed central portion and a flat disk portion 212 extending from the edge of the hub 213.

The material 210, however, contains SiC particles which produce a relatively high frictional resistance in that portion of the material 210 which is contacted by a press whereby the disk 211 is formed, and the disk 211 is very likely to crack in its bent portions 214 and 215. Under these circumstances, it is difficult to manufacture a brake disk 211 by press forming from such a composite material.

SUMMARY OF THE INVENTION

It is an object of this invention to provide a process for manufacturing a part of high quality from a metal matrix composite material at a low cost.

According to a first aspect of this invention, there is provided a process comprising the steps of preparing an aluminum-based composite material containing an aluminum alloy and having an appropriate diameter, cutting the material into a plurality of blanks each having an appropriate thickness, heating the blanks to an appropriate temperature ranging from the solidus temperature, Ta, of the aluminum alloy minus 50 (Ta−50) deg. C. to Ta deg. C., and press forming each blank, while holding it at the appropriate temperature.

When the temperature of the material is lower than (Ta−50) deg. C., it has a high resistance to plastic deformation, is difficult to work on and requires a high working load. When its temperature exceeds Ta, a liquid phase may be formed and cause the material to crack during its plastic deformation because of its low compressibility. According to this invention, therefore, the temperature to which the blank is heated is at least equal to (Ta−50) deg. C. to ensure its good workability, and does not exceed Ta deg. C. to ensure its good compressibility.

The aluminum-based composite material is prepared by reducing a porous reinforcing material composed of a metal oxide in a furnace containing a magnesium nitride atmosphere to expose a metal on at least a part of the reinforcing material, and impregnating the porous material with a molten aluminum alloy. The reduction of the metal oxide forms a metallized surface on the porous material and thereby produces an improved wetting property between the metal oxide and the molten aluminum alloy. The composite material is of high workability, since the aluminum and reinforcing material are strongly joined to each other by chemical contact. It is easy of plastic working and enables a reduction of production cost.

The die may have a heater for holding the blank at the temperature between (Ta−50) deg. C. and Ta deg. C., so that the blank may be high in workability and easy to press form into a desired shape. The blank temperature is preferably in the range of (Ta−20) to Ta, or for example, from 563 to 583 deg. C. to ensure that it be easy to work on to thereby enable a reduction of production cost. Moreover, it is preferably in the range of (Ta−40) to (Ta−33), or for example, from 543 to 550 deg. C. to ensure that the blank be of high compressibility to thereby attain a high working accuracy.

According to a second aspect of this invention, there is provided a process comprising the steps of preparing a die and a dual punch having a solid cylindrical inner punch portion and a hollow cylindrical outer punch portion surrounding the inner punch portion, setting a blank of an aluminum-based composite material on the die, lowering the inner punch portion to press against the central portion of the blank and holding it thereagainst to give a nearly final shape to the central portion of the blank and lowering the outer punch portion to press against the remaining portion of the blank to give a nearly final shape thereto.

The process includes two press forming steps in which a dual punch is used to form a blank of an aluminum-based composite material into a disk-shaped part. Firstly, the inner punch portion is pressed down against the central portion of the blank to form it into a desired shape, while drawing out the composite material uniformly from the center of the blank to give a high working accuracy to its central portion. Then, the inner punch portion is held against the central portion of the blank and the die is closed. Secondly, the outer punch portion is pressed down against the remaining portion of the blank to draw it out or cause it to flow in the die to form the composite material into a nearly final shape. As a result, there is obtained a product which requires only a small amount of machining work thereafter and thereby contributes to a reduction of production cost.

The outer punch portion forced into the closed die compresses the composite material therein by applying a uniform compressive force to the outer surface of the material at right angles thereto, so that it may be possible to reduce any tensile stress on the surface of the blank, prevent its surface from cracking, remove any internal defects from it and give it a tight structure to thereby make a part of improved quality.

The first press-forming step employing the inner punch portion may be used to form, for example, the boss portion of a crank damper pulley. The boss portion is easy to form by press forming from an aluminum-based composite material if the inner punch portion has an appropriately shaped surface.

According to a third aspect of this invention, there is provided a process comprising the steps of forming a sheet of an aluminum alloy covering the whole surface of a sheet of a metal matrix composite material to prepare a sandwiched structure having an aluminum alloy layer on both sides of the composite material, pressing the central portion of the sandwiched structure to form a recess therein, and removing the aluminum alloy layer from the remaining portion of the structure surrounding the recess.

A sheet of an aluminum alloy is formed to cover both sides of a sheet of a metal matrix composite material to prepare a sandwiched structure and the sandwiched structure is pressed in its central portion to have a recess formed therein. The aluminum alloy is high in workability and can, therefore, be shaped to cover both sides of the composite material to reduce any frictional resistance shown by the composite material during press forming, so that it may be possible to reduce any stress produced in the material and prevent it from cracking. The aluminum alloy layers are removed from the remaining portion of the material surrounding the recess to expose the metal matrix composite material to thereby enable the manufacture of a part of high strength. Thus, the process may most advantageously be employed for making a disk of a metal matrix composite material for a disk brake for an automobile.

The metal matrix composite material may be prepared by incorporating ceramic particles into an aluminum alloy. The aluminum alloy used as the matrix contributes to a reduction in weight of the composite material and the ceramic particles contribute to improving its strength. Thus, it is the most suitable material for brake disks.

BRIEF DESCRIPTION OF THE DRAWINGS

Certain preferred embodiments of this invention will be described in detail below, by way of example only, with reference to the accompanying drawings, in which:

FIG. 1 is a diagram showing the layout of an apparatus for preparing an aluminum-based composite material according to this invention;

FIGS. 2A to 2D are a set of views illustrating a process for preparing a billet of an aluminum-based composite material by the apparatus shown in FIG. 1;

FIG. 7 is a flowchart showing a process for press forming a disk-shaped part from an aluminum-based composite material according to a second embodiment of this invention;

DETAILED DESCRIPTION OF THE PREFERRED EMBODIMENTS

Figure 3A:
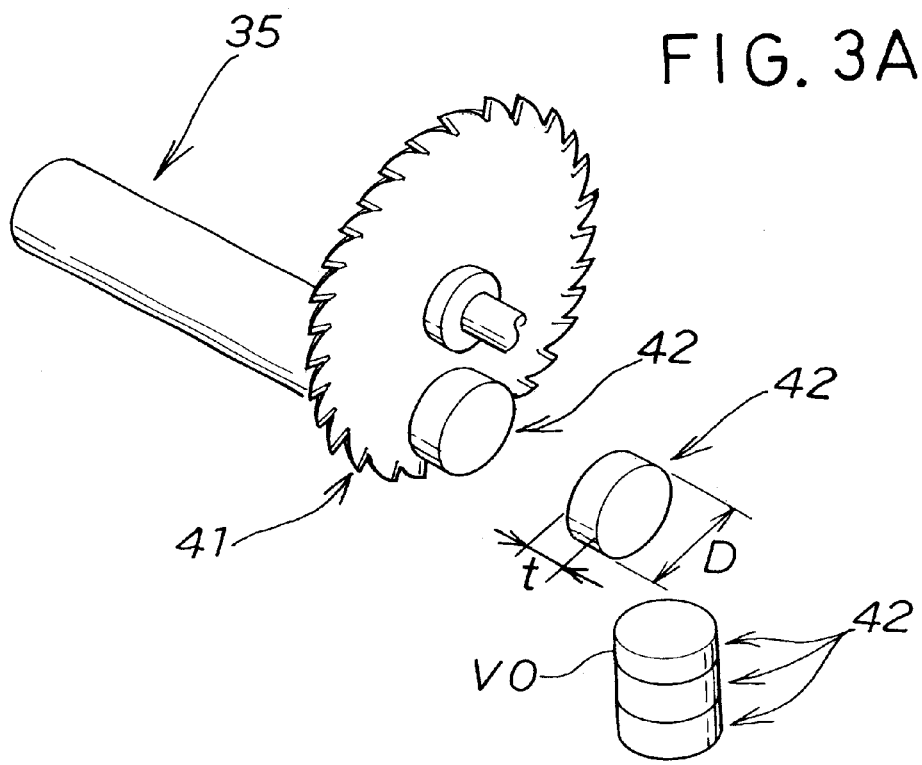
FIG. 3A is a perspective view showing the preparation of blanks from the billet according to a first embodiment of this invention.

The following description is merely exemplary in nature and is in no way intended to limit the invention, its application or used.

Referring first to FIG. 1, an apparatus 1 for preparing a metal matrix composite material, for example, an aluminum-based material has an atmosphere-controlled furnace 2, a heater 3 associated with the furnace 2, a device 6 for supplying an inert gas into the furnace 2 and a vacuum pump 7 for evacuating the furnace 2. The furnace 2 contains a first crucible 8 and a second crucible 9. The heater 3 has a control unit 11, a temperature sensor 12 and a heating coil 13. The gas supplying device 6 includes a bottle 15 holding argon gas (Ar) 14, a bottle 17 holding nitrogen gas ($N_2$) 16, a pipeline 18 for supplying those gases from the bottles 15 and 17 to the furnace 2 and a pair of pressure gauges 19 connected to the pipeline 18. The first crucible 8 is a container for a porous reinforcing material consisting of a metal oxide, or more specifically porous alumina ($Al_2O_3$) 21 and an aluminum alloy 31. The second crucible 9 is a container for magnesium (Mg) 32. The aluminum alloy 31 may, for example, be an Al—Mg—Si alloy known as JIS-A6061 (hereinafter referred to simply as A6061). A magnesium alloy may be used instead of magnesium 32.

Description will now be made of the preparation of an aluminum-based composite material with reference to FIGS. 2A to 2D. The first crucible 8 in the furnace 2 is charged with alumina 21 and then an aluminum alloy 31, and the second crucible 9 with magnesium 32, as shown in FIG. 2A. The vacuum pump 7 is driven to evacuate the furnace 2 and is stopped when an appropriate vacuum degree has been obtained therein. Argon gas 14 is supplied from its bottle 15 into the furnace 2 as shown by arrows (1) to create an argon gas atmosphere which protects the aluminum alloy 31 and magnesium 32 from oxidation. Then, the furnace 2 is heated by the heating coil 13, so that the alumina 21, aluminum alloy 31 and magnesium 32 may be heated to a temperature of, say, about 750 to 900 deg. C. As a result, the aluminum alloy 31 is melted and the magnesium 32 is vaporized, as shown by an arrow (2). The temperature of the furnace 2 is detected by the temperature sensor 12 and is controlled to a set level by the control unit 11 in accordance with a signal received from the sensor 12.

Then, nitrogen gas 16 is supplied from its bottle 17 into the furnace 2 as shown by arrows (3) in FIG. 2B. The furnace 2 has an elevated pressure (of, say, 0.5 kg/cm$^2$ over the atmospheric pressure) and is purged with nitrogen gas 16, while the argon gas 14 is discharged through the vacuum pump 7, so that the furnace 2 may have a nitrogen gas atmosphere. The nitrogen gas 16 reacts with magnesium 32 to produce magnesium nitride ($Mg_3N_2$) 34. The magnesium nitride 34 has a reducing action and converts at least a part of alumina 21 to metallic aluminum. The aluminum exposed on at least a part of alumina 21 gives it an improved wetting property. The molten aluminum alloy 31 is diffused through the aluminum converted from alumina 21, and is solidified to make an aluminum-based composite material 35 in the form of a billet as shown in FIG. 2C. The improved wetting property of alumina 21 as mentioned above gives a high elongation to the composite material 35, so that it is high in workability and easy of plastic deformation.

An elevation in the pressure of the nitrogen gas atmosphere in the furnace 2 accelerates the diffusion of the molten aluminum alloy 31 and thereby the formation of the composite material 35, while a reduction of the pressure is equally effective for promoting the diffusion. It is alternatively possible to employ a porous molded body of alumina 21 containing an aluminum alloy containing magnesium as a starting material. It is also possible to employ a porous molded body of alumina particles containing a magnesium powder and an aluminum alloy placed on it.

The composite material 35 is finished by a numerically controlled lathe 36 into a billet having a specific diameter D, as shown in FIG. 2D.

Figure 3B:
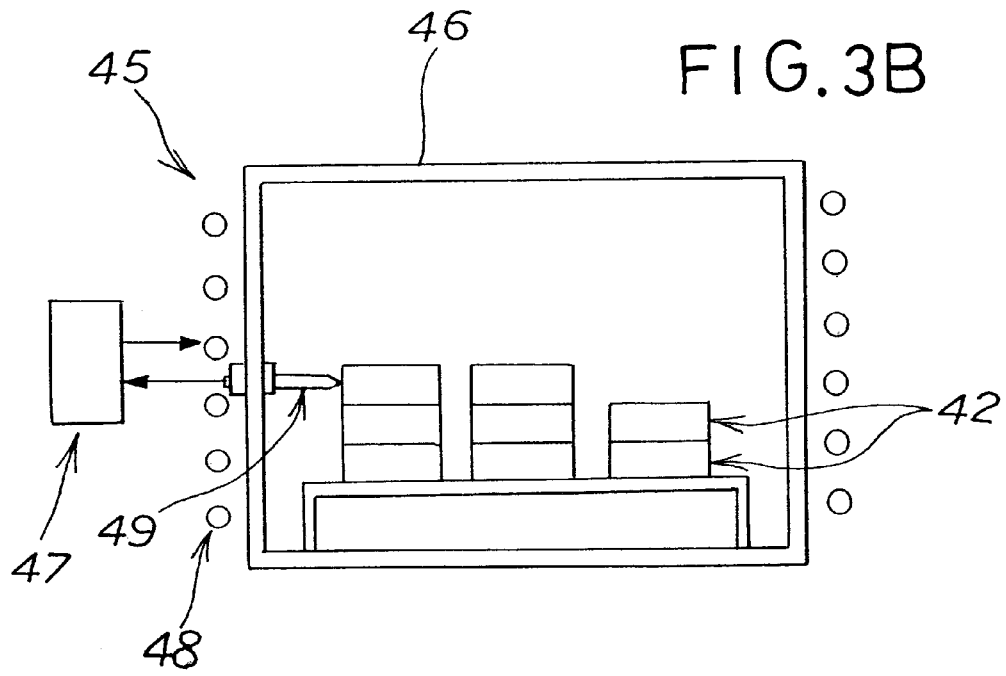
FIG. 3B is a diagram showing the heating of blanks.

Description will now be made with reference to FIGS. 3A to 5B of a process for preparing a part from the billet 35 as obtained. The billet 35 is cut by a cutter 41 into a plurality of blanks 42 each having a specific thickness t, as shown in FIG. 3A. The volume VO of each blank 42 can be expressed as VO=($\pi$/4)×D2×t. The blanks 42 are heated in a heating furnace 45, as shown in FIG. 3B. The blanks 42 are placed in the main body 46 of the furnace 45 and after heating conditions including the target temperature, heating rate and holding time are set on a control panel 47, the furnace 45 is switched on. The furnace 45 also has a heating coil 48 and a temperature sensor 49.

The target temperature is based on the solidus temperature Ta of the aluminum alloy and should not be over 50 deg. C. lower than Ta, or should be at least (Ta−50) deg. C., while it should not be higher than Ta. If the aluminum alloy is A6061, the target temperature may, for example, be 580 deg. C., since its solidus temperature Ta is 583 deg. C. and (Ta−50) is 533 deg. C. The solidus temperature is the temperature at which a substance which is composed of two or more components and undergoes a change from solid (phase) to (solid and liquid phases) and to liquid (phase) when heated with a rise in temperature starts melting and changing from solid to liquid (phase). It is alternatively the temperature at which a substance which undergoes changing from liquid (phase) to (liquid and solid phases) and to solid (phase) when cooled with a drop in temperature completes solidification.

Figure 4A:
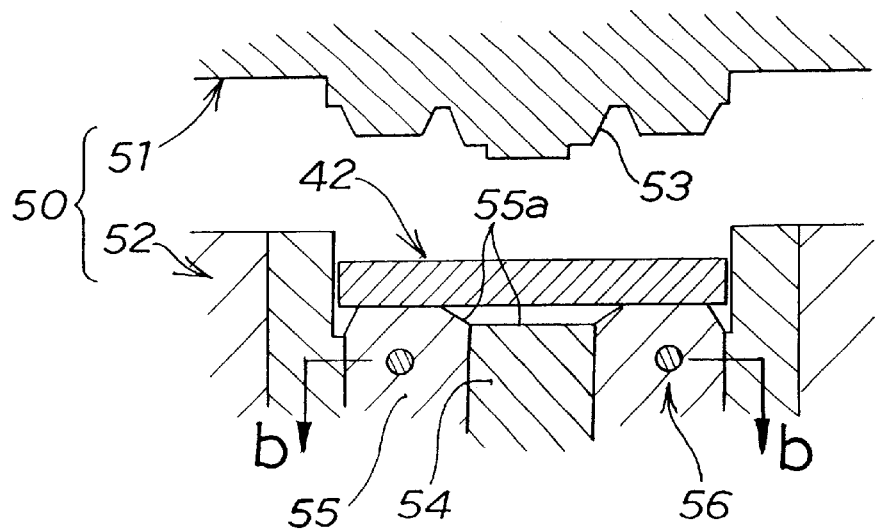
FIG. 4A is a view showing a blank mounted in a die for press forming.
Figure 4B:
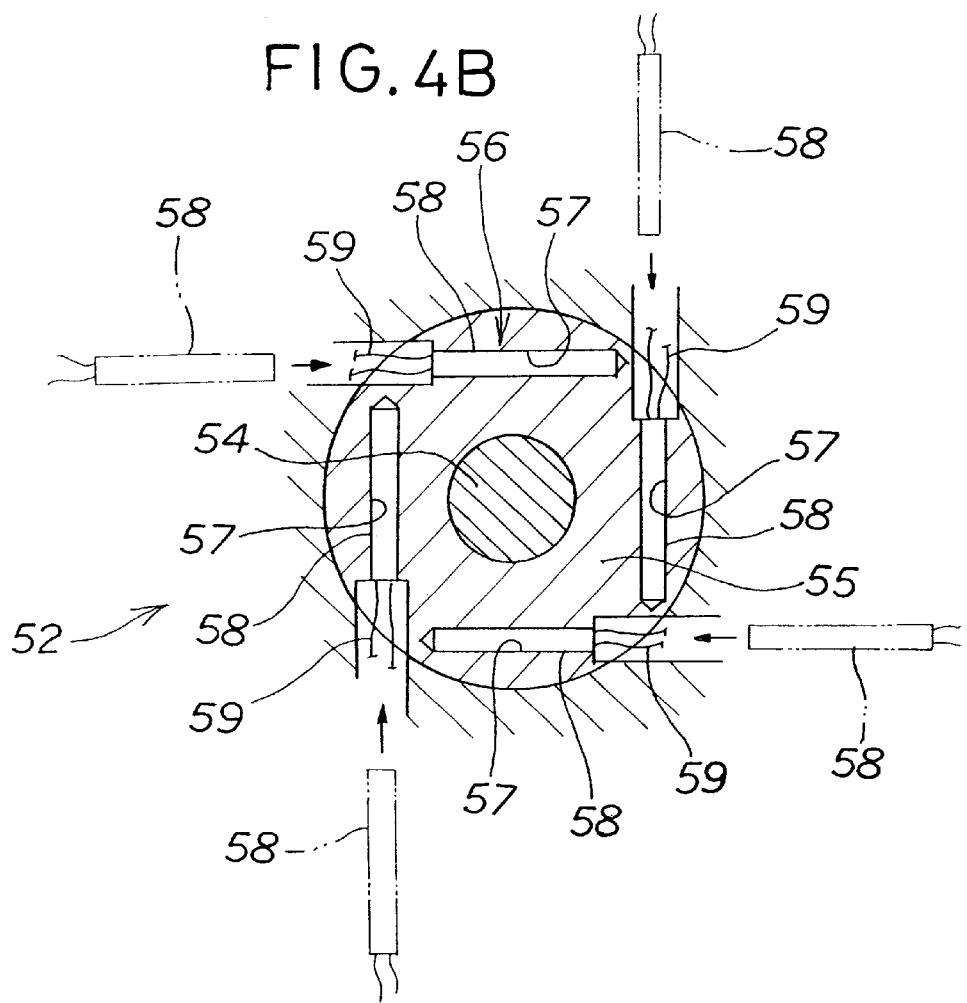
FIG. 4B is a sectional view taken along the line b—b of FIG. 4A.

The blanks 42 which have been properly heated are removed from the furnace 45 and are transferred to a press. Each blank 42 is set in a press mold 50, as shown in FIG. 4A. The mold 50 comprises a punch 51 and a die 52. The punch 51 has a working surface 53 and the die 52 has a central rod-shaped inner die 54, an outer die 55 surrounding it, the inner and outer dies 54 and 55 defining a working surface 55a at their top, and a heater 56 embedded in the outer die 55 below its working surface for holding the blank 42 at an appropriate temperature. The blank 42 is placed on the working surface 55a of the die 52 held at an appropriate temperature by the heater 56. The heater 56 comprises a plurality of solid cylindrical cartridge heaters 58 shown by phantom lines in FIG. 4B to be fitted in one of a plurality of holes 57 made in the outer die 55 below its working surface 55a. Each cartridge heater 58 has lead wires 59 connected to a mold temperature controller not shown, and the die 52 has a temperature sensor connected to the mold temperature controller, whereby its temperature is automatically controlled to a selected level. The selected level is a temperature between (Ta−50) and Ta, and may, for example, be 580 deg. C. if the aluminum alloy is A6061, as mentioned before. In any event, each blank 42 is so heated by the heater 56 that its temperature may not drop below (Ta−50). The heater 56 may alternatively be of any other type and the punch 51 may be equipped with an appropriate heater, too, if required.

Figure 5A:
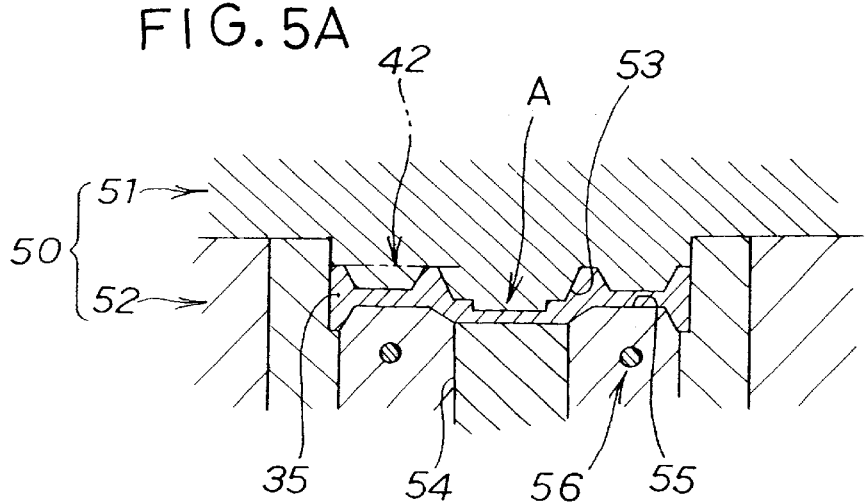
FIG. 5A is a view showing the blank pressed by a lowered punch.
Figure 5B:
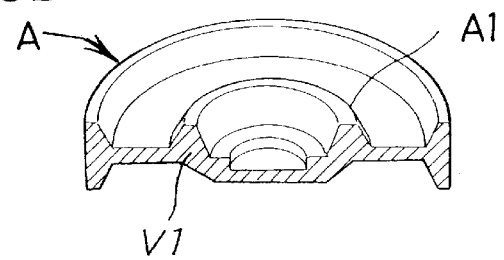
FIG. 5B is a fragmentary perspective view of a part obtained from the blank pressed as shown in FIG. 5A.

Then, each blank 42 is pressed in the mold 50 to make a part A of the aluminum-based composite material, as shown in FIG. 5A. More specifically, the punch 51 is operated under appropriate conditions including stroke, speed and pressure, and fitted in the die 52 to close the mold 50 and press its working surface 53 against the blank 42 to draw out its composite material 35 or cause it to flow, so that the material 35 may be compressed in the closed mold 50 to form the part A.

The composite material 35 is easy to work on owing to its low resistance to plastic deformation, since its temperature is maintained between (Ta−50) and Ta. Thus, the part can be produced at a reduced cost. Its low resistance to plastic deformation does not require any high working load, either, but permits the use of any existing facilities for production at a reduced cost. Owing to its temperature maintained as mentioned above, the composite material 35 is very easy to move in the closed mold by a single application of pressure by the punch 51 and compress into a nearly final shape, so that it is possible to reduce the amount of any machining work including cutting and grinding and thereby realize a great reduction in any allowance for machining work with an improved yield of the material and thereby a reduced cost of production. It is also possible to remove any internal defects of the composite material 35 and make a product of high quality having a tight structure to thereby reduce the amount of any inspection work and therefore the cost of production.

Then, the punch 51 is raised and the inner die 54 is ejected upward, so that the part A may be separated from the working surface 55a of the die and removed from the mold 50. The part A is better shown in FIG. 5B, though partially, and has a cylindrically formed central portion A1.

Figure 6:
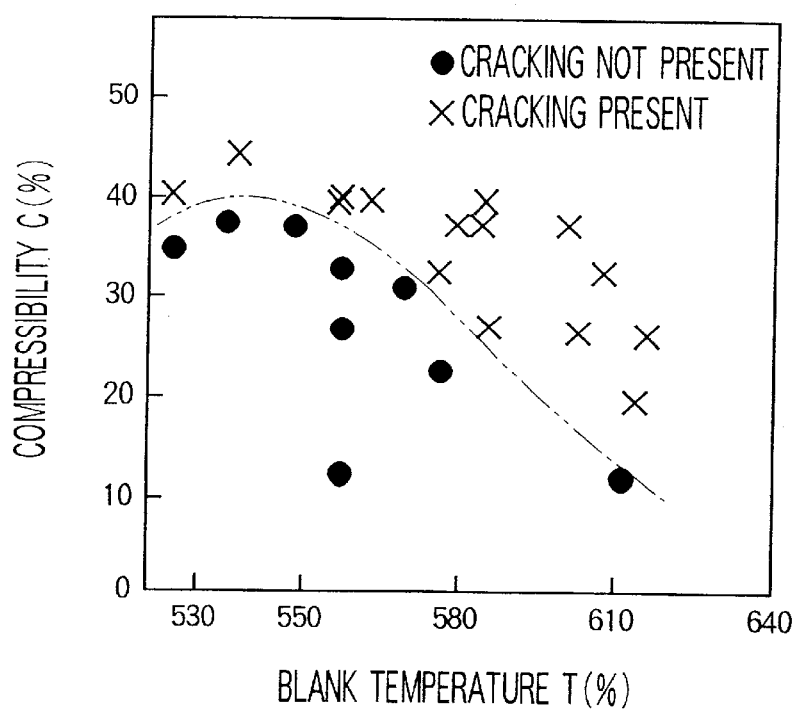
FIG. 6 is a graph showing the compressibility of blanks in relation to their temperature.

FIG. 6 shows the results of a test conducted on a plurality of blanks for determining their compressibility C under heat in relation to their temperature T. The blanks were of an aluminum-based composite material containing alumina in a matrix of an aluminum alloy A6061. The compressibility C represents a change made in volume by compression, and is calculated as $C (\%) = ((V0-V1)/V0) \times 100$, where V0 is the volume of a blank and V1 is that of a part formed therefrom by compression. In the graph, each black circle indicates a blank compressed without cracking, while each x indicates a cracked blank.

As is obvious from FIG. 6, a higher compressibility C with a less possibility of cracking can be obtained with a rise in blank temperature T until it reaches about 540 deg. C. A higher blank temperature T over about 550 deg. C., however, brings about a lower compressibility C with a more possibility of cracking. A higher blank temperature T brings about an improved workability, but if it exceeds a solidus temperature of 583 deg. C., the formation of a liquid phase brings about a drastic lowering in compressibility C with a higher possibility of cracking. A high compressibility C is desirable for making an aluminum-based composite material of improved quality having a tight structure in a nearly final shape. Thus, a blank of an aluminum-based composite material containing a matrix of A6061 is heated to a temperature T which should not be lower than 533 deg. C. (Ta−50) in view of workability, but should not be higher than 583 deg. C. (Ta, or solidus temperature of A6061) in view of compressiblity C.

A further temperature limitation can be introduced to achieve a higher working accuracy and a lower cost of production. For example, a reduction in the cost of temperature control can be obtained if the blank temperature is set at 535 deg. C., so that its control may be easier within the range of 523 deg. C. (Ta−60) to 548 deg. C. (Ta−35), while a high compressibility C is maintained. The blank temperature is preferably in a higher range of from 563 deg. C. (Ta−20) to 583 deg. C. (ta) to ensure that it be easier to work on to thereby enable a further reduction of production cost. Moreover, it is preferably in the range of from 543 deg. C. (Ta−40) to 550 deg. C. (Ta−33) to ensure that the blank be of higher compressibility to thereby attain a higher working accuracy.

Description will now be made of a process for making a part according to a second embodiment of this invention with reference to FIGS. 7 to 8D. Referring first to FIG. 7, the process comprises Steps 1 to 4:

ST01—Preparing a die and a dual punch having an inner and an outer punch portion;

ST02—Setting a blank of an aluminum-based composite material in the die;

ST03—Shaping the central portion of the blank by the inner punch portion; and

ST04—Shaping the remaining portion thereof by the outer punch portion.

Figure 8A:
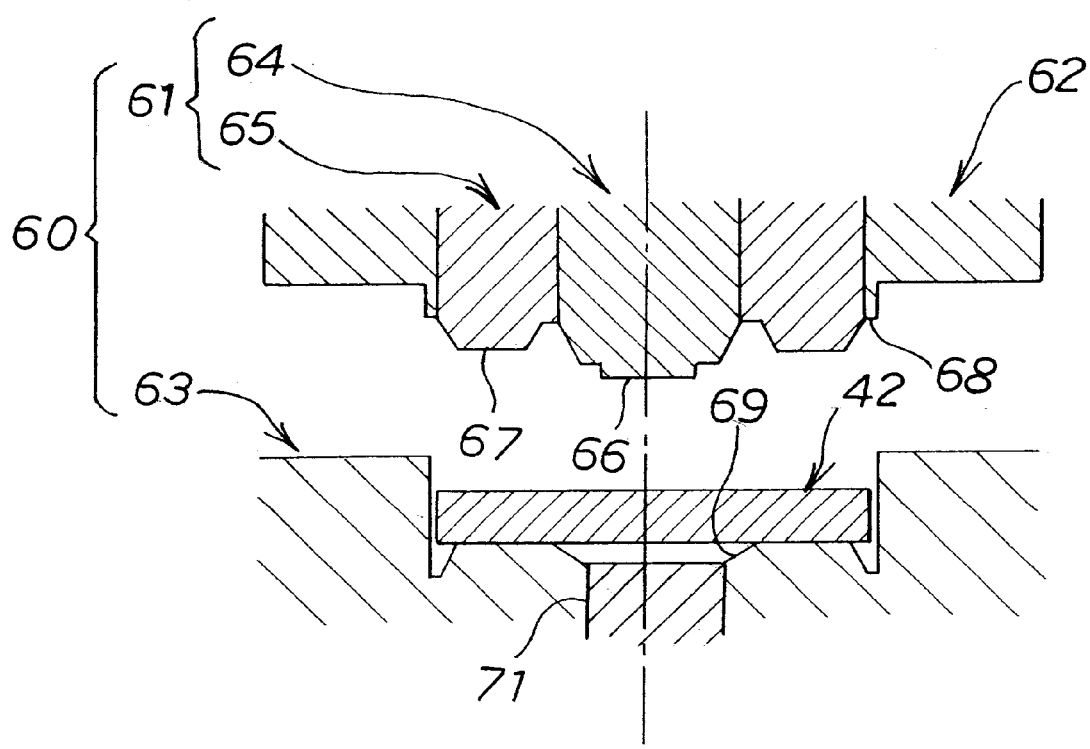
FIGS. 8A to 8D are a series of views showing the step of preparing a pressing die and the first and second press-forming steps according to the second embodiment of this invention.
Figure 8B:
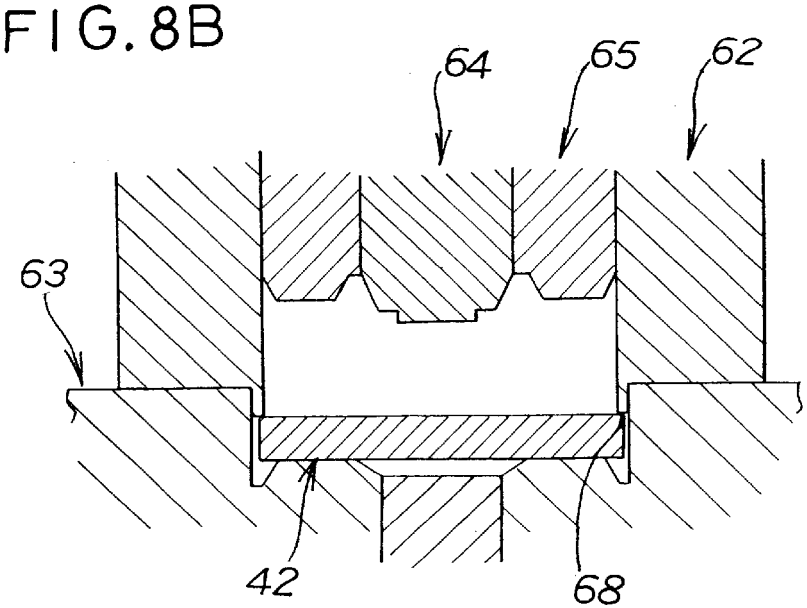

Referring now to FIGS. 8A to 8D, a press mold 60 comprises a punch 61, a cylindrical stripper 62 surrounding the punch 61 and a die 63 facing the punch 61. The punch 61 is of the dual type having a solid cylindrical inner punch portion 64 and a hollow cylindrical outer punch portion 65 surrounding it. The inner punch portion 64 has a working surface 66 at its lower end and the outer punch portion 65 also has a working surface 67 at its lower end, while the stripper 62 likewise has a working surface 68. The die 63 has a working surface 69 and an ejector rod 71. A blank 42 is set in the die 63 and positioned in the center of its working surface 69, as shown in FIG. 8A. Then, the stripper 62 is lowered to start closing the mold, while its working surface 68 is held against the blank 42 along its edge to prevent its movement, as shown in FIG. 8B.

Figure 8C:
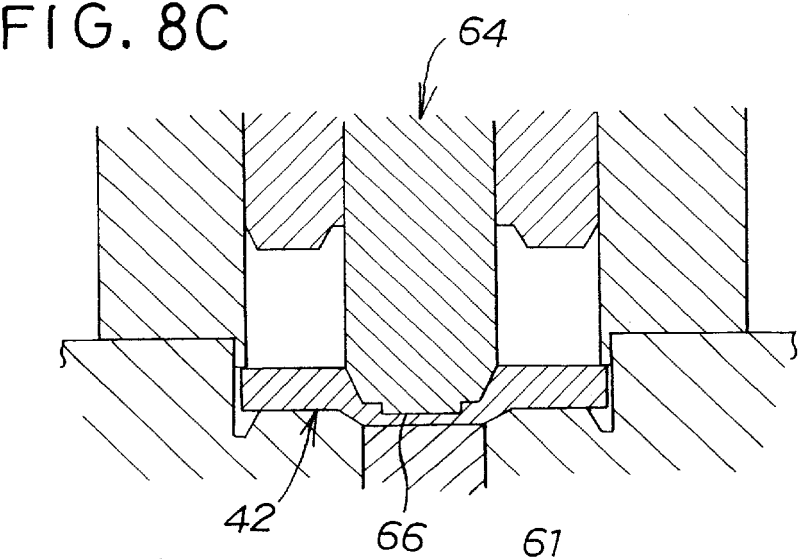

Then, the inner punch portion 64 is lowered under appropriately controlled conditions including its stroke, speed and pressure so that its working surface 66 may be pressed down against the blank 42 to shape its central portion, as shown in FIG. 8C (first press-forming step). The inner punch portion 64 is left at a standstill to hold the blank 42 in position. As the inner punch portion 64 is pressed down into the central portion of the blank 42, the blank 42 has its volume distributed uniformly from its center and can be worked on with an improved accuracy. As the inner punch portion 64 compresses only the central portion of the blank 42, its composite material 35 (FIG. 3A) is easily drawn out or caused to flow into a particular shape. As the working surface 66 of the inner punch portion 64 has a limited area, it exerts a high pressure on the blank 42 to facilitate its plastic working.

Figure 8D:
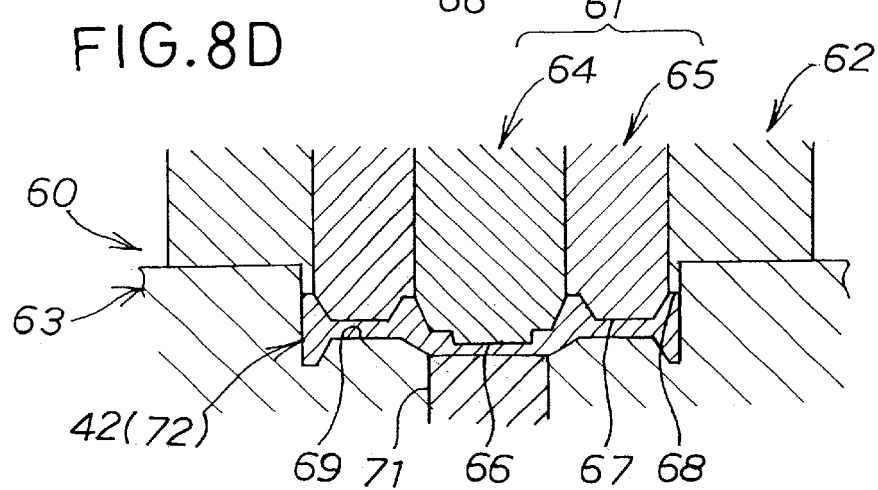

Then, the outer punch portion 65 is lowered under appropriately controlled conditions including its stroke, speed and pressure to shape the remaining portion of the blank 42, whereby a disk-shaped part 72 is obtained, as shown in FIG. 8D (second press-forming step). The outer punch portion 65 is lowered to have its working surface 67 pressed against the blank 42 in the mold closed by the working surfaces 66, 68 and 69 of the inner punch portion 64, stripper 62 and die 63, respectively, and exerts a uniform compressive force on the surface of the composite material 35 at right angles thereto, while allowing it to be drawn out or flow into every corner of the mold, so that no undesirably high tensile stress may be produced in the surface of the material and cause it to crack, but a part of high quality may be obtained. The part 72 has a nearly final shape and does not require any undesirably large amount of machining work, such as cutting or grinding. Its nearly final shape makes it possible to realize a drastic reduction in the amount of the material as an allowance for machining work, an improved yield of material and thereby a corresponding reduction in the cost of production. It is also possible to remove any internal defects from the composite material 35 and obtain a product of high quality having a tight structure to thereby eliminate any complicated step of inspection and achieve a corresponding reduction in the cost of production.

Then, the punch 61 is raised, then the stripper 62 is raised, and finally the ejector rod 71 is raised to release the part 72 from the die surface 69, whereafter the part 72 is removed from the mold 60.

Figure 9A:
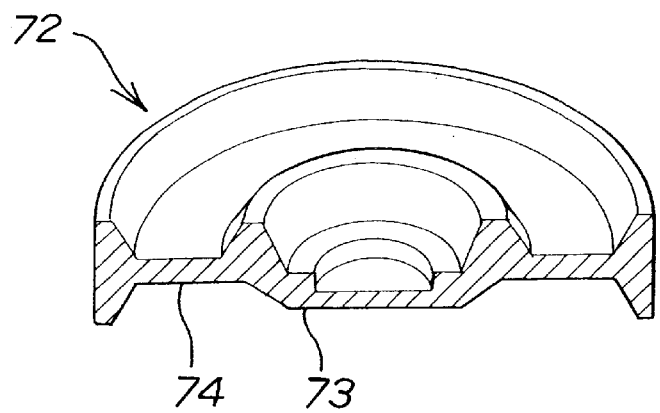
FIGS. 9A and 9B are a set of views showing a disk-shaped part made by the process shown in FIGS. 8A to 8D and its machining.
Figure 9B:
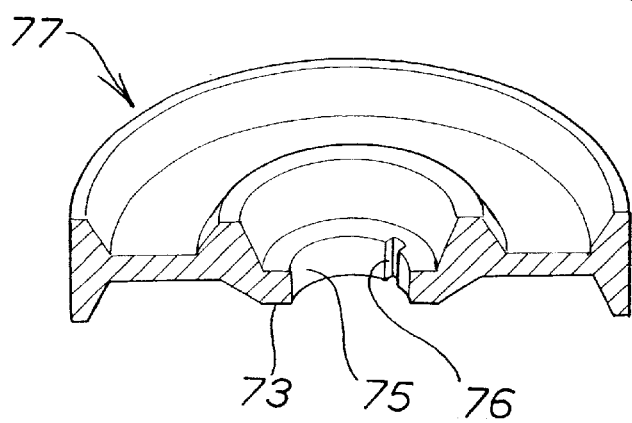

The disk-shaped part 72 is used to make a part for a pulley and has a boss portion 73 for attaching the pulley to a shaft and a disk portion 74 extending radially outwardly from the outer periphery of the boss portion 73, as shown in FIG. 9A. The boss portion 73 is not yet in its final shape, but a shaft bore 75 and a key groove 76 are formed through the boss portion 73, as shown in FIG. 9B, whereby a pulley part 77 is obtained. The part 77 is conveyed to a pulley assembly station. The formation of the shaft bore 75 not during the press-forming operation, but thereafter makes it possible to use a single press mold for making several kinds of parts having different diameters (nominal) falling within a certain range and thereby cut down the cost of preparing press molds.

Figure 10:
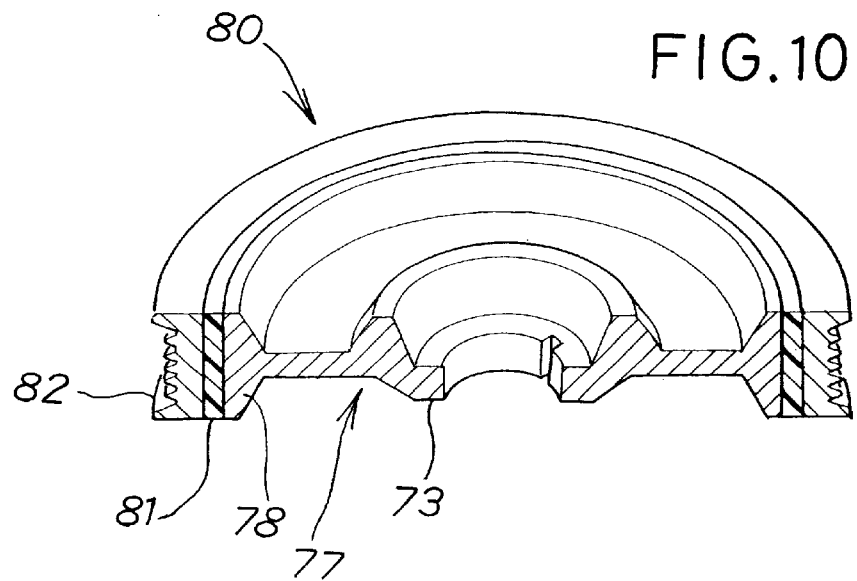
FIG. 10 is a fragmentary perspective view of a crank damper pulley made by using the part as shown in FIGS. 9A and 9B.

The part 77 is used to make a crank damper pulley 80 as shown in FIG. 10. The pulley 80 has a damping member 81 attached to the rim 78 of the disk-shaped part 77 and a grooved member 82 fitted about the damping member 81. The boss portion 73 of the pulley 80 is easy to form from an aluminum-based composite material at a low cost by the inner punch portion 64 as shown in FIG. 8C.

Although the punch 61 shown in FIGS. 8A to 8D is of the dual structure, it is alternatively possible to use a punch having three or even more portions. Moreover, the punch 61, stripper 62 and die 63 may each have a different working surface other than what has been shown, as required.

Figure 11:
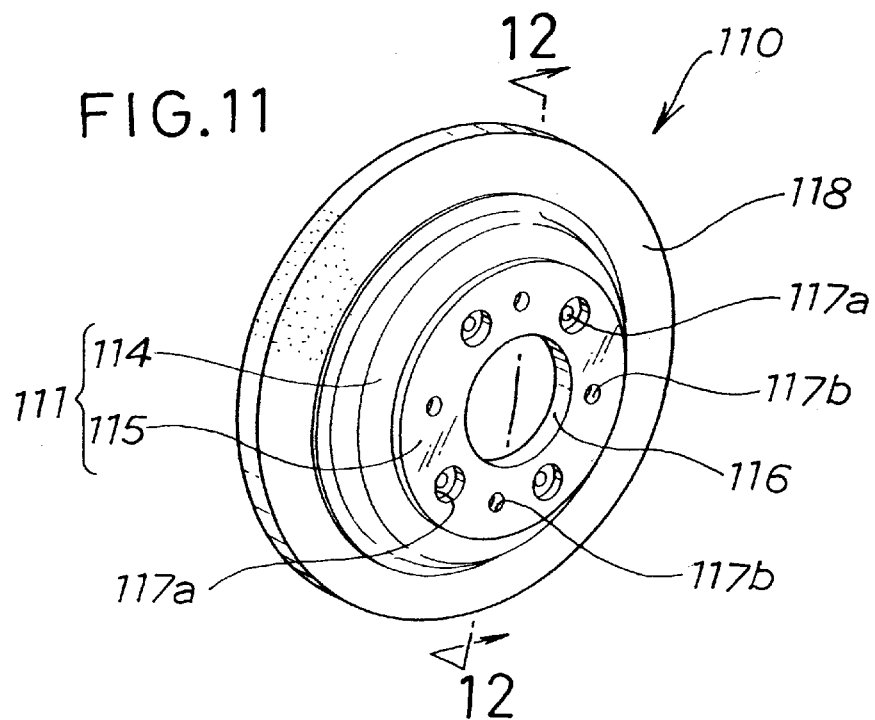
FIG. 11 is a perspective view of a brake disk formed from a metal matrix composite material.
Figure 12:
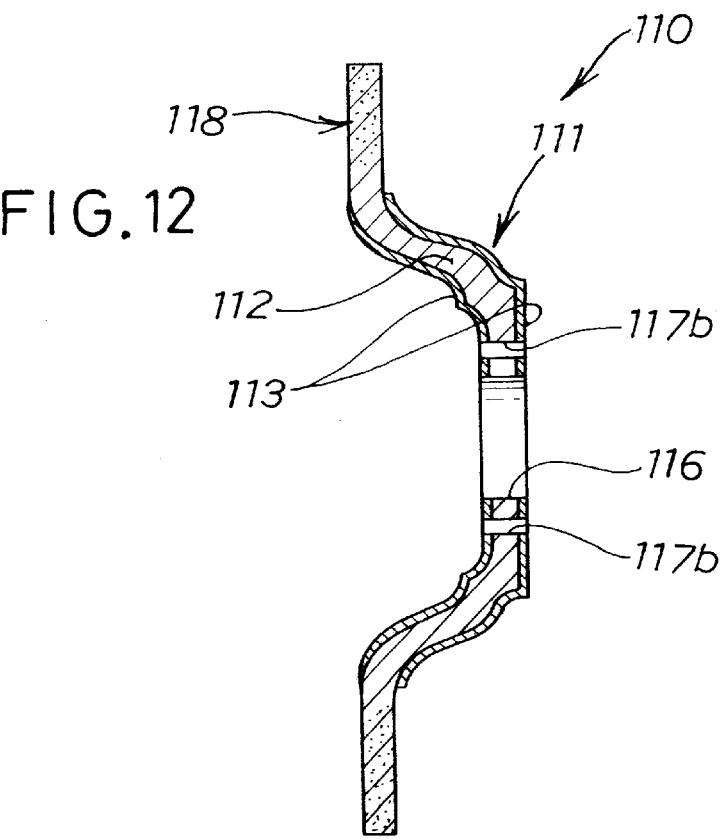
FIG. 12 is a sectional view taken along the line 12—12 of FIG. 11.

Attention is now directed to FIGS. 11 and 12 showing a brake disk made from an aluminum-based composite material by a process according to a third embodiment of this invention. The brake disk 110 has a substantially cylindrical hub portion 111 and a sliding flange or disk portion 118 extending radially outwardly from it. The hub portion 111 has a side wall 114 and a cover 115 formed at the top of the side wall 114 as an integral part thereof. The cover 115 has a central opening 116 and a plurality of bold holes 117a and a plurality of stud holes 117b around the opening 116. Each bolt hole 117a is used to receive a bolt not shown for securing the brake disk 110 to a drive shaft not shown, while each stud hole 117b is used to fit a stud not shown for attaching a wheel not shown to the brake disk 110. The disk portion 118 is gripped between two brake pads not shown and is, therefore, required to be of high strength and wear resistance.

The hub portion 111 is a sandwiched structure formed from an aluminum-based composite material 112 sandwiched between two aluminum alloy layers 113, as shown in FIG. 12. The aluminum alloy layers 113 do not present any problem, since the hub portion 111 is attached to a drive shaft by bolts, and to a wheel by studs, as stated above. On the other hand, the disk portion 118 does not have any aluminum alloy layer 113, but has the composite material 112 exposed on both sides, since it is required to be of high strength and wear resistance on both sides to withstand its contact with the brake pads. The composite material 112 may contain ceramic particles, such as SiC, in an aluminum alloy matrix, though it may contain any other reinforcing material. The brake disk 110 is light in weight owing to the aluminum alloy used as the metal matrix, and high in strength owing to the ceramic particles which it may contain. Thus, it may contribute to a reduction in vehicle weight.

Description will now be made of a process for making a brake disk of the kind as described above. The process described before with reference to FIGS. 2A to 2D is employed for preparing a billet of an aluminum-based composite material and forming it into a shape suitable for extrusion molding. The aluminum-based composite material is suitable for extrusion molding owing to its high moldability and plastic deformability as stated before.

Figure 13A:
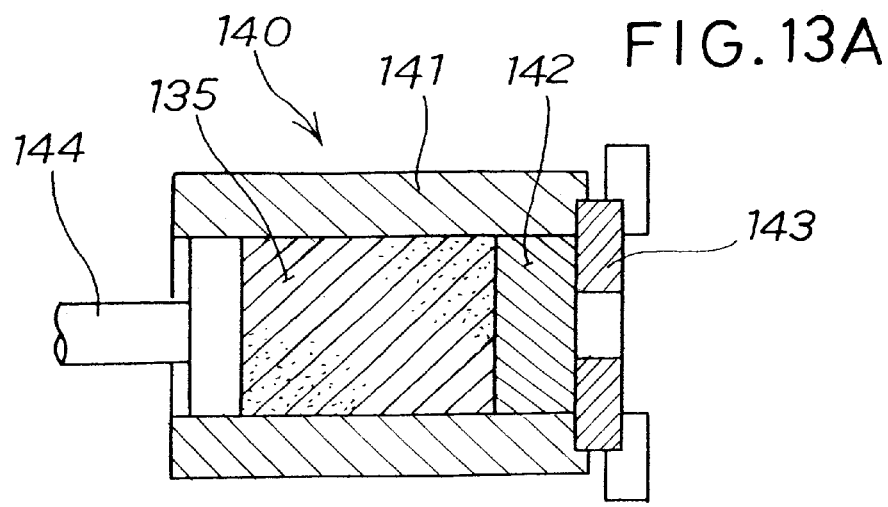
FIGS. 13A to 13C are a series of views showing the preparation of a flat clad material by extrusion from a billet of an aluminum-based composite material.
Figure 13B:
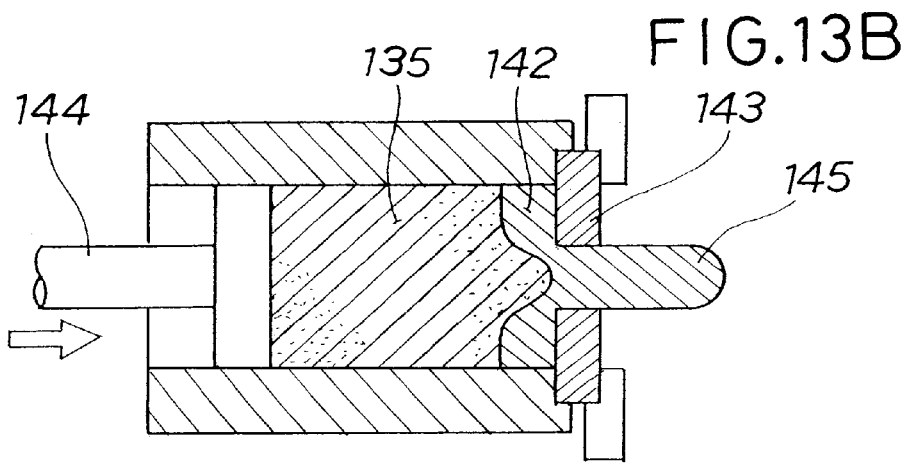
Figure 13C:
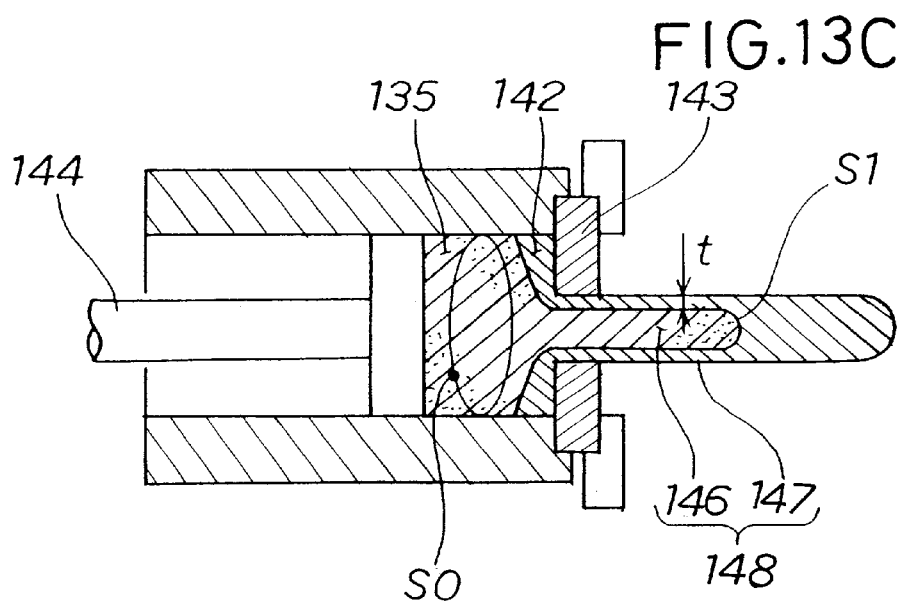

FIGS. 13A to 13C show a process for making a sandwiched structure having an aluminum-based composite material sandwiched between two aluminum alloy layers as shown in FIG. 12. FIG. 13A shows an extrusion press 140 having a container 141 closed at one end by a die 143. A billet 142 of an aluminum alloy is first placed in the container 141 in close proximity to the die 143 and a billet 135 of an aluminum-based composite material as prepared by the process shown in FIGS. 2A to 2D is placed behind the billet 142. The billet 142 is preferably of an aluminum alloy having a high corrosion resistance, such as A3000 or A5000 according to the Japanese Industrial Standard. A ram 144 is driven in the direction as shown by an arrow in FIG. 13B to push the composite material 135 and thereby force the aluminum alloy 142 out through a slot in the die 143 to forma thick sheet 145 thereof. The composite material 135 starts to flow into the aluminum alloy 142. As the composite material 135 is further pushed by the ram 144, it is forced out through the die 143 to form a sheet 146 in the sheet 145 of the aluminum alloy 142, while converting the sheet 145 into a thin sheet 147 covering the sheet 146, whereby a sheet of a clad material 148 is formed, as shown in FIG. 13C.

The thin sheet 147 of the aluminum alloy is so formed as to have a thickness t over 0.2 mm, since a sheet having a thickness t of 0.2 mm or less is very likely to peel off the sheet 146 of the composite material. A high extrusion speed can be obtained with a low extrusion force, since the sheet 147 of the aluminum alloy contacts the die 143 and is so high in workability that no undesirable frictional resistance may occur to the sheet 146 of the composite material. Moreover, the aluminum alloy sheet 147 is so low in hardness that the die 143 may not easily be worn, but may have a prolonged life.

The clad material 148 is easy to form by extrusion, since the composite material 135 is high in workability owing to a strong bond made by chemical contact between its aluminum alloy and reinforcing material. The sheet 146 of the composite material is still easier to form owing to the high workability of the aluminum alloy sheet 147 forming the surface portion contacting the die 143.

The deformation of the composite material 135 in a high reduction ratio makes it possible to remove any internal defects from it and obtain an extruded product of high quality having a tight structure. The reduction ratio R can be calculated by equation, $R=S0/S1$, where S0 is the cross sectional area of the composite material 135 to be extruded and S1 is that of the clad material 148 as extruded.

Figure 14:
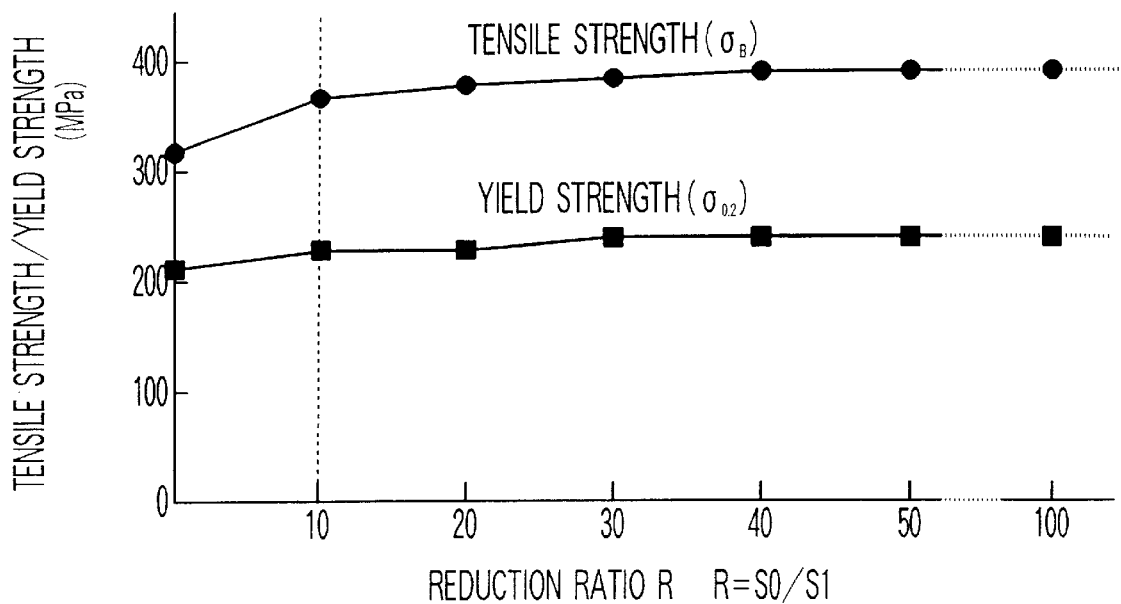
FIG. 14 is a graph showing the tensile strength and yield strength of clad materials in relation to their reduction ratio.

FIG. 14 shows the tensile and yield strength ($\sigma_B$ and $\sigma_{0.2}$) of clad materials made as described above in relation to the reduction ratio (R) employed. The symbol $\sigma_{0.2}$ stands for 0.2% yield strength. As is obvious from the graph, tensile strength ($\sigma_B$) increases with reduction ratio (R) as long as R is less than 10. Therefore, it is possible to obtain a higher tensile strength by employing a higher reduction ratio in that range. It is likewise possible to obtain a higher yield strength. If R is 10 or higher, however, the tensile strength does not show any appreciable increase with the reduction ratio, but remains nearly the same. The yield strength also remains nearly the same. A high reduction ratio is desirable for productivity. A reduction ratio over 100, however, requires a large extrusion force which may only be produced by new facilities having a large capacity. Thus, the reduction ratio for the aluminum-based composite material may range from 10 in view of its mechanical properties to 100 in view of the capacity of the extruder which is available.

Figure 15:
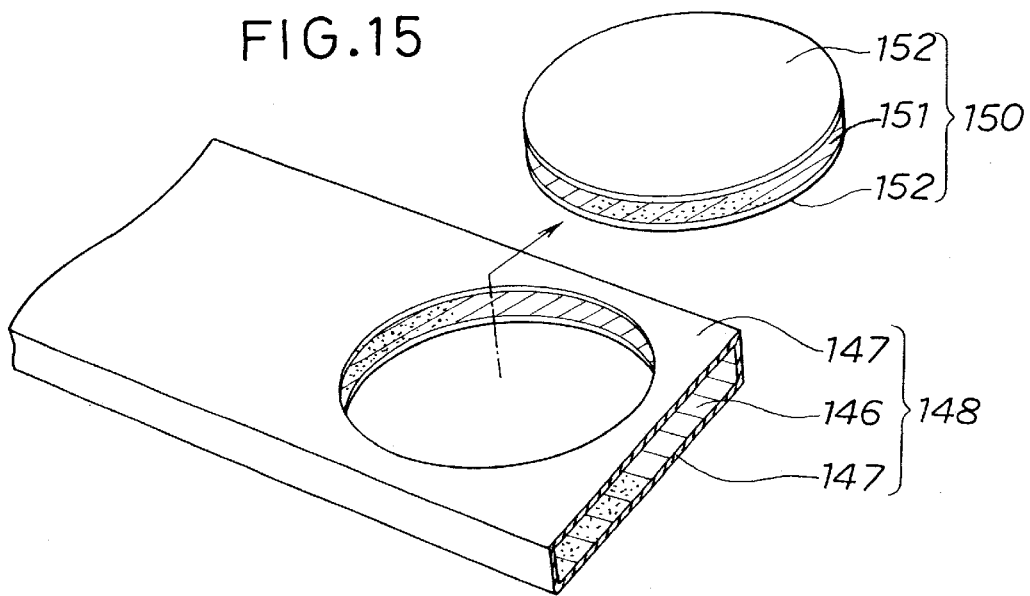
FIG. 15 is a view showing the formation of a disk-shaped sandwiched structure from a clad material.

The clad material 148 is set in a press not shown and a disk-shaped sandwiched structure 150 is cut from it with a punch and a die, as shown in FIG. 15. The sandwiched structure 150 has a disk 151 of aluminum-based composite material sandwiched between two disks 152 of aluminum alloy.

Figure 16A:
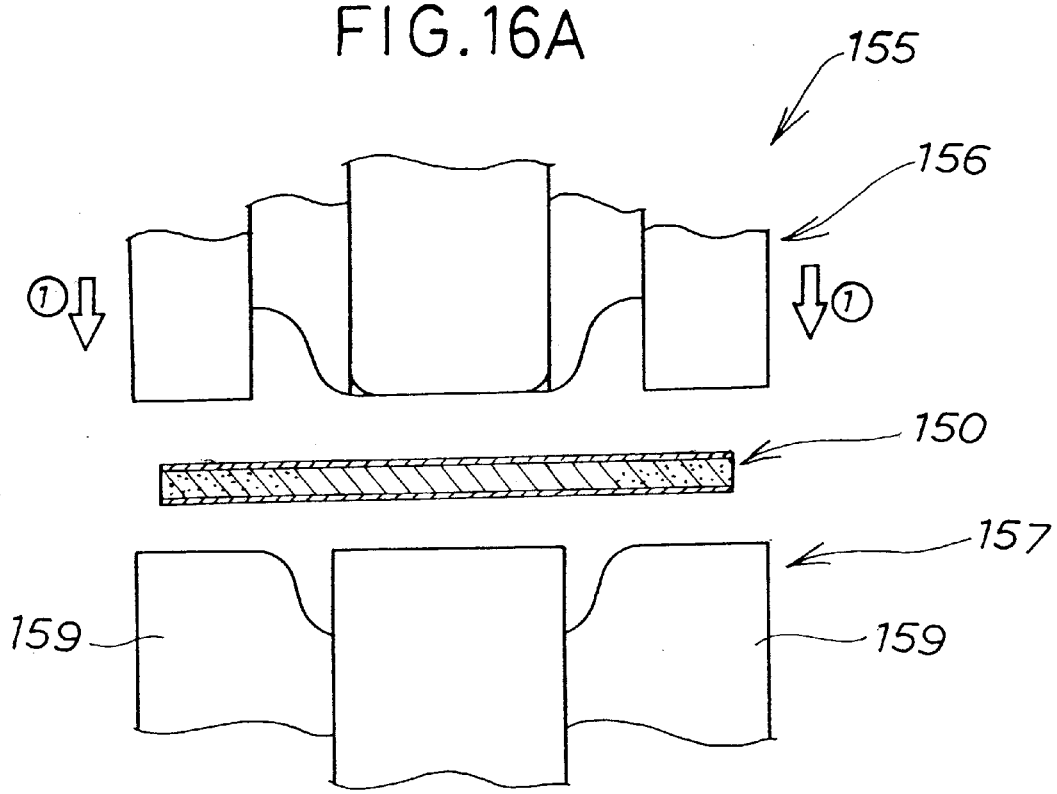
FIGS. 16A to 16F are a series of views showing the manufacture of a brake disk by pressing from a disk-shaped sandwiched structure.
Figure 16B:
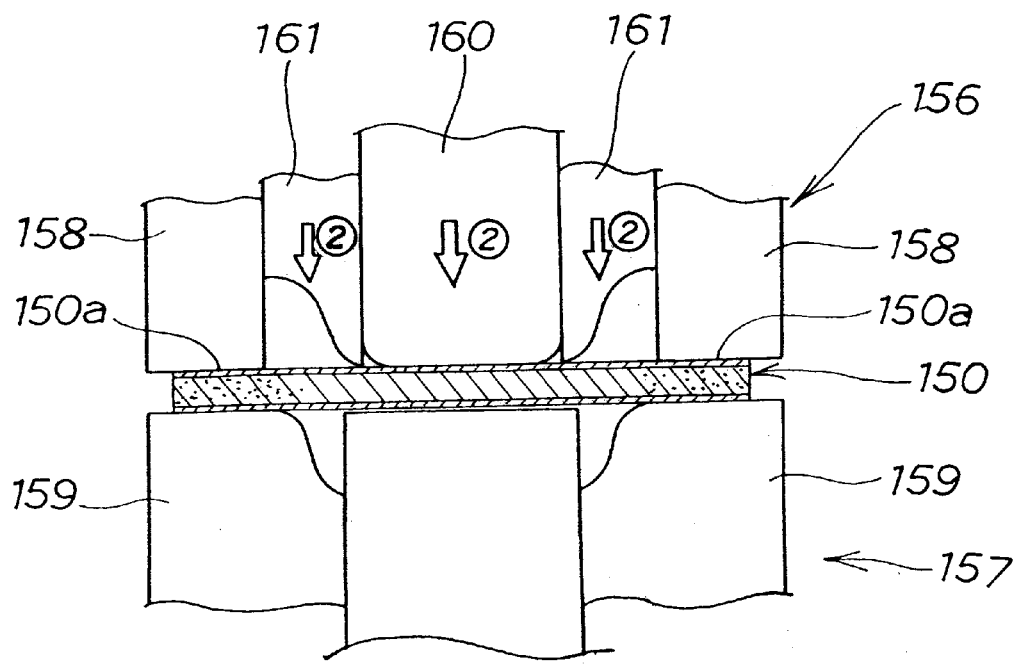

Attention is now directed to FIGS. 16A to 16F showing a process for press forming the sandwiched structure 150 into a desired shape. The sandwiched structure 150 is placed between an upper punch assembly 156 and a lower die assembly 157 in a press 155, as shown in FIG. 16A, after the upper punch assembly 156 has been raised to its top dead center, and the upper punch assembly 156 is lowered as shown by arrows (1). The upper punch assembly 156 includes a punch 158 for holding the sandwiched structure 150 in position to prevent its displacement and wrinkling. The sandwiched structure 150 has its edge portion 150a held against a fixed die 159 in the lower die assembly 157 by the punch 158, as shown in FIG. 16B. The upper punch assembly 156 also includes a central punch 160 and an outer punch 161 which are lowered as shown by arrows (2).

Figure 16C:
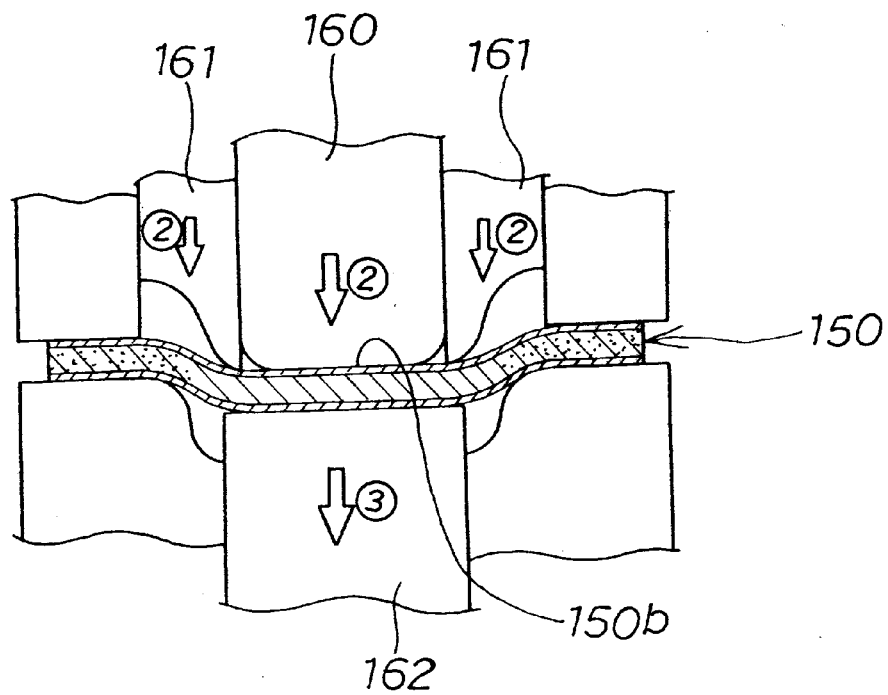
Figure 16D:
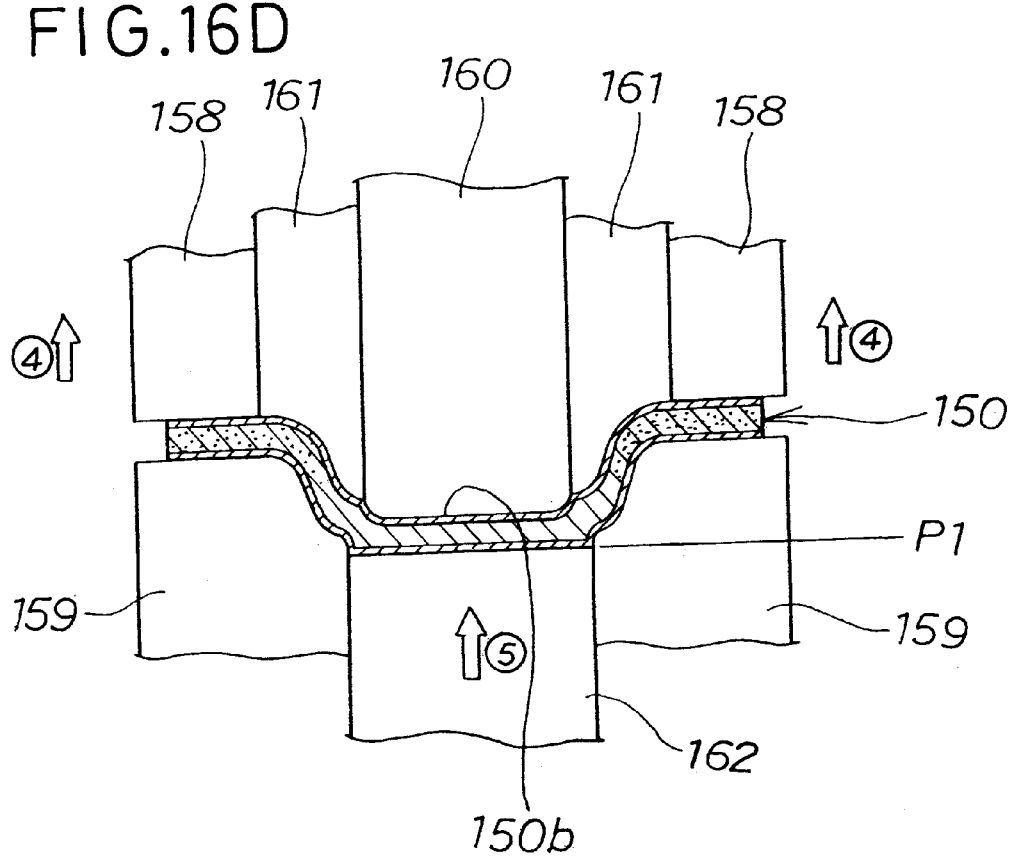

The central and outer punches 160 and 161 are further lowered as shown by arrows (2) in FIG. 16C, while a movable die 162 in the lower die assembly 157 is lowered as shown by an arrow (3), so that the sandwiched structure 150 may have its central portion 150b pressed down by the punches 160 and 161. The movable die 162 stops its lowering upon reaching a specific position P1, as shown in FIG. 16D, so that the sandwiched structure 150 may have a recess formed in its central portion 150b. Then, the punches 158, 160 and 161 are raised as shown by arrows (4), while the die 162 is raised as shown by an arrow (5) to lift the press-formed product of the sandwiched structure 150 from the fixed die 159.

Figure 16E:
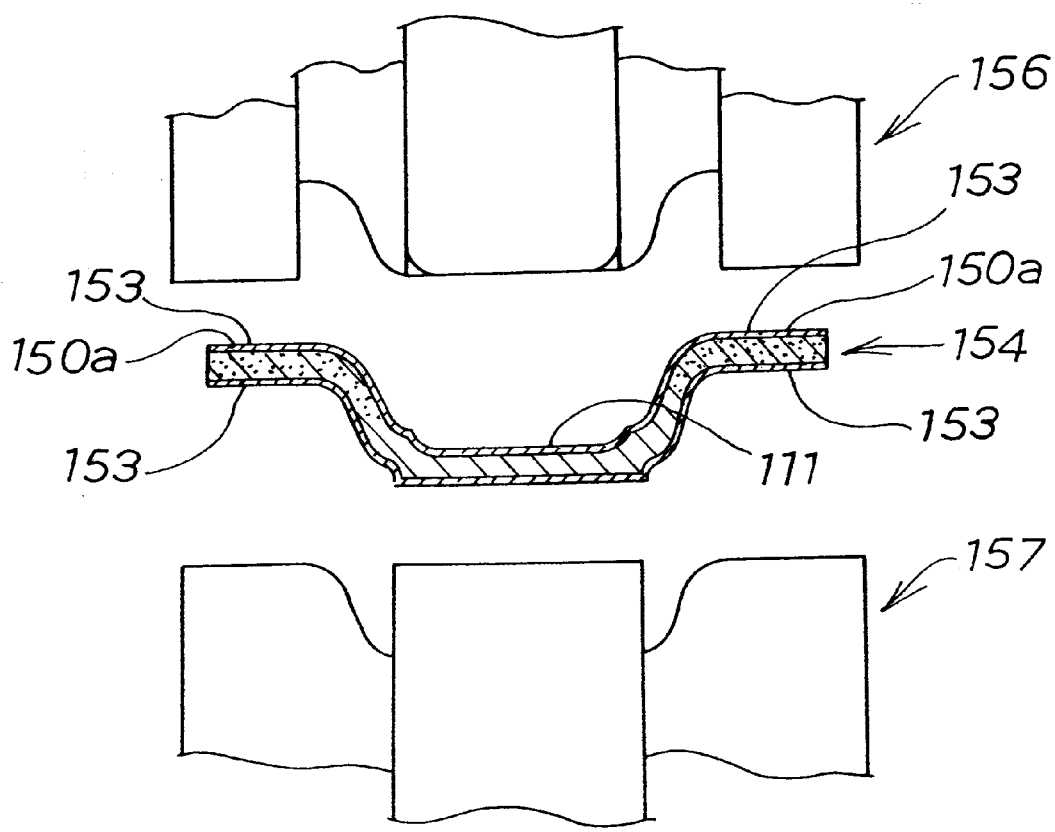

The press-formed product 154 has a hub portion 111 (see FIGS. 11 and 12) formed by its central recess, as shown in FIG. 16E. The aluminum slloy sheets 152 covering both sides of the composite material 151 as shown in FIG. 15 reduce any frictional resistance to reduce any stress occurring to the composite material 151 and causing it to crack. The aluminum alloy sheets 152 now exist as aluminum alloy layers 153 on the product 154.

Figure 16F:
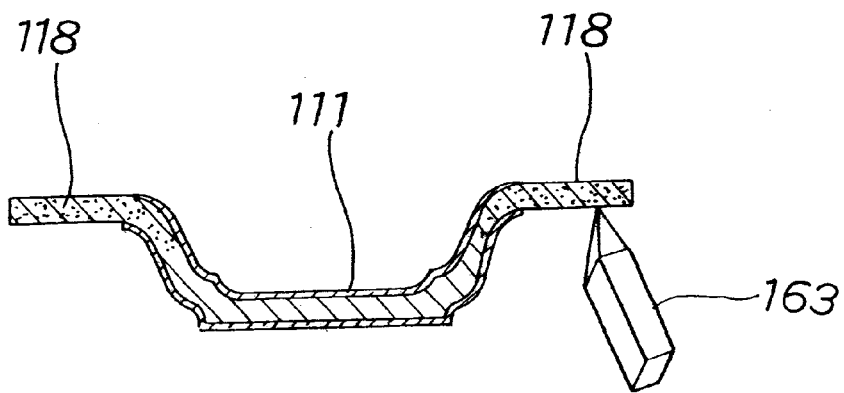
Figure 17:
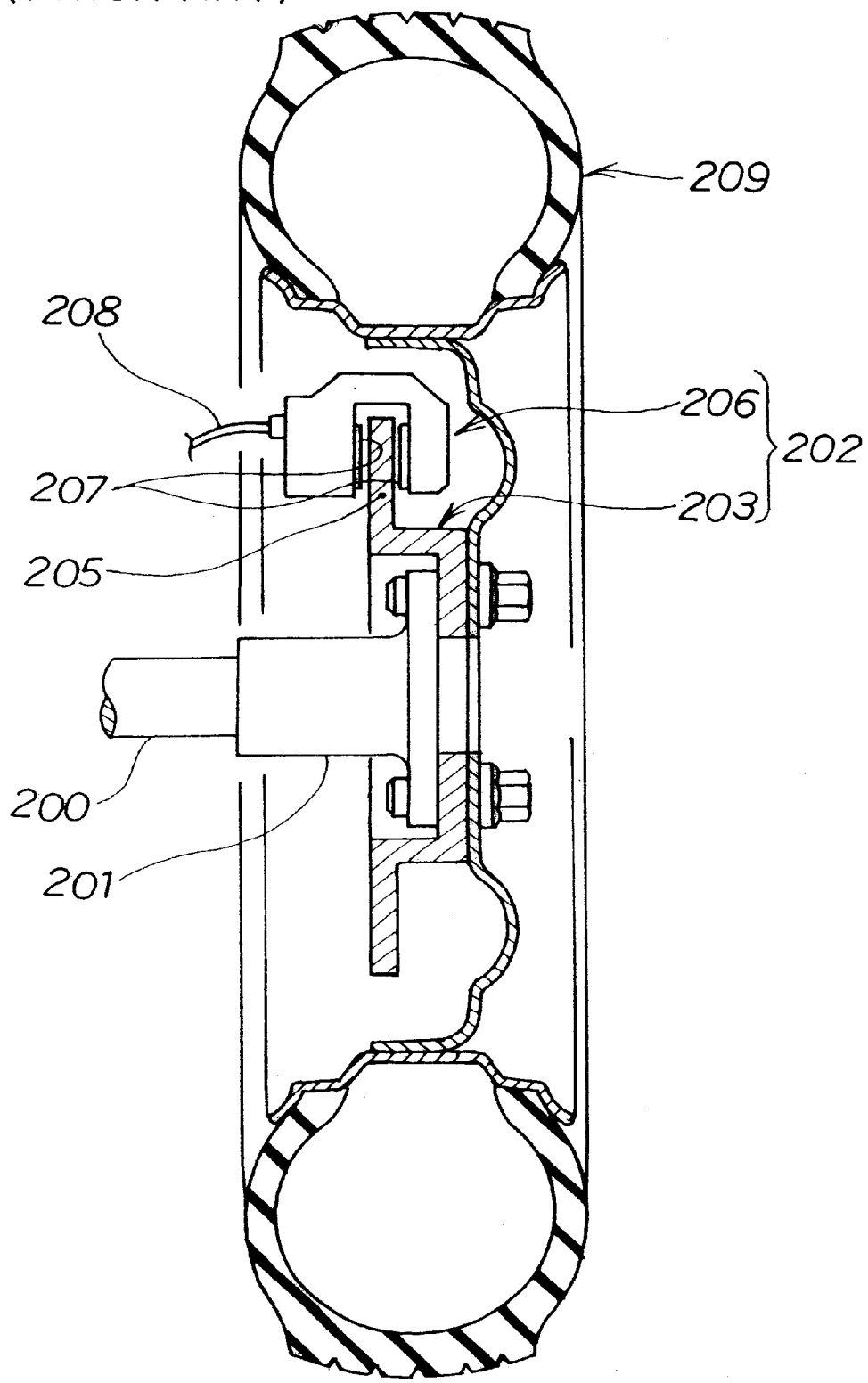
FIG. 17 is a side elevational view, partly in section, of a typical automobile disk brake known in the art.
Figure 18A:
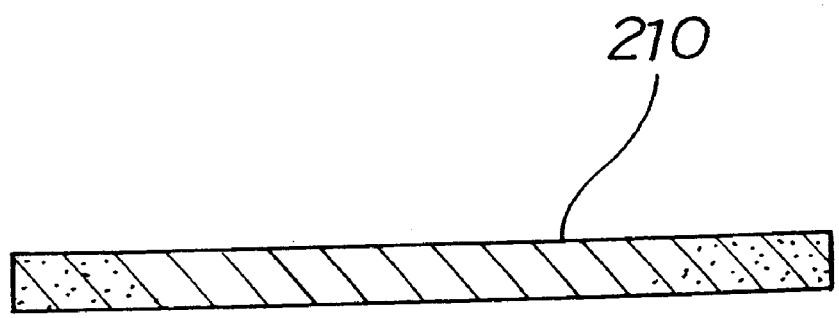
FIGS. 18A and 18B are a set of views explaining a known process for manufacturing a brake disk from a metal matrix composite material.
Figure 18B:
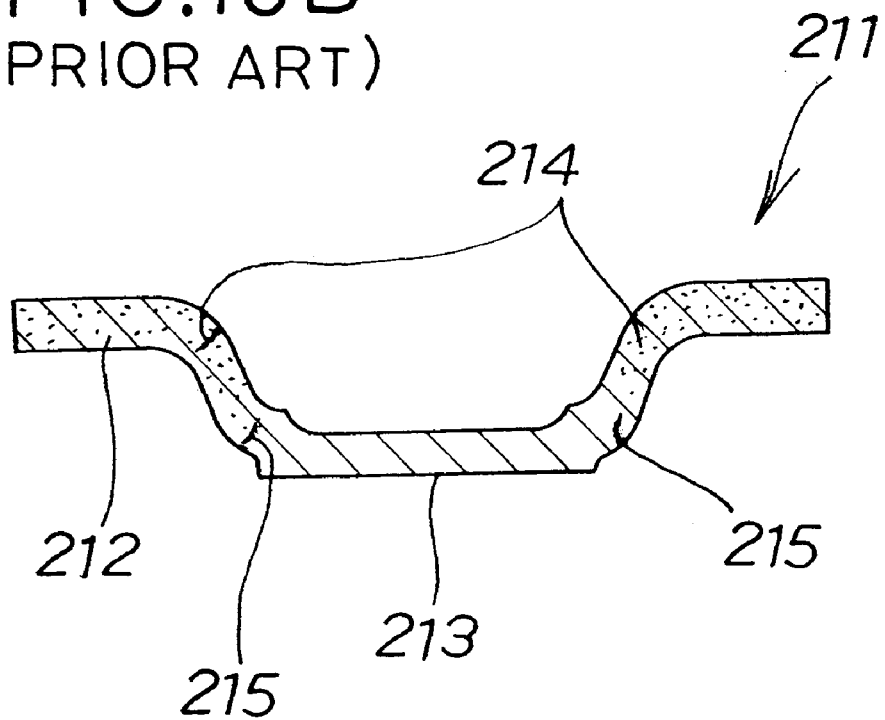

The product 154 has the edge portion 150a not worked on by the press. The aluminum alloy layers 153 are removed from the edge portion 150a by a cutter 163 as shown in FIG. 16F, whereupon the product has a disk (or sliding) portion 118 adapted to face brake pads not shown. Then, the product has bolt and stud holes formed in its disk portion 118 to provide a brake disk of a metal matrix composite material as shown at 110 in FIG. 11. This brake disk is less expensive than any product made by casting. The disk portion 118 made by exposing the composite material 151 is very high in strength.

Although the sandwiched structure 150 has been shown and described as being disk-shaped, it is alternatively possible to employ a rectangular sandwiched structure for press forming and cut the disk portion of its press-formed product into a circular shape.

Obviously, various minor changes and modifications of the present invention are possible in the light of the above teaching. It is therefore to be understood that within the scope of the appended claims, the invention may be practiced otherwise than as specifically described.

What is claimed is:

1. A process for manufacturing a part of an aluminum-based composite material comprising the steps of:

preparing an aluminum-based composite material containing an aluminum alloy and having an appropriate diameter;

cutting the material into a plurality of blanks each having an appropriate thickness;

heating the blanks to an appropriate temperature ranging from $(Ta-40)°$ C. to $(Ta-33)°$ C. wherein Ta is the solidus temperature; and press forming each blank, while holding the blank at the appropriate temperature wherein each blank is press formed at a compressibility not less than 30%.

2. The process according to claim 1, wherein the composite material is prepared by reducing a porous reinforcing material composed of a metal oxide in the presence of magnesium nitride to expose a metal on at least a part of the reinforcing material and impregnating the reinforcing material with a molten aluminum alloy.

3. The process according to claim 1, wherein the blanks are heated by a heater embedded in a die.

* * * * *